United States Patent Office 2,739,962
Patented Mar. 27, 1956

2,739,962
PRODUCTION OF CRYSTALLINE PROCAINE PENICILLIN

Marinus P. Bardolph, Alton, Ill., assignor to Commercial Solvents Corporation, Terre Haute, Ind., a corporation of Maryland No Drawing. Application October 29, 1953, Serial No. 389,157

5 Claims. (Cl. 260—239.1)

My invention relates to a process for the production of crystalline procaine penicillin. More particularly my invention relates to a process for producing crystalline procaine penicillin drectly from the first butyl acetate extract derived from the broth in which the penicillin has been produced.

Crystalline procaine penicilln has been produced in the past by a variety of processes. One method involves reacting a water soluble salt of procaine with a water soluble alkali metal salt of penicillin in aqueous solution. It has also been obtained by reacting a water soluble salt of procaine with an aqueous extract from the first organic solvent extract of the fermentation broth. It has also been obtained by reacting procaine base with the first organic solvent extract from the fermentation broth.

Treating the first amyl acetate extract of the fermentation broth with procaine base has consistently yielded crystalline procaine penicillin. However, when butyl acetate is employed for extracting penicillin in the acid form from the fermentation broth it has been found that the addition of the procaine base does not immediately produce crystalline procaine penicillin, but instead produces an oil which must later be caused to crystallize in order to obtain crystalline procaine penicillin. In such a procedure, therefore, the use of butyl acetate as the extractant for the acid form of penicillin requires additional undesirable steps in order to produce the desired crystalline procaine penicillin, which additional steps are made unnecessary by my improved process.

I have now discovered a method of treating the first butyl acetate extract from the penicillin fermentation broth with the procaine base whereby procaine penicillin is readily precipitated in the crystalline form.

My new process for the production of crystalline procaine penicillin comprises adding from about 0.5 to about 4.0 ml. of water for each million units of penicillin present to the butyl acetate solution containing the acid form of penicillin and the procaine base. The water can be added at the same time as the procaine base and after addition of the procaine base, but I prefer to add the water just prior to the addition of the procaine base.

Crystalline procaine penicillin is produced by bringing into contact butyl acetate solutions containing the acid form of penicillin, procaine base, and from 0.5 to 4.0 ml. of water per million units of penicillin. I prefer to agitate the solutions continuously while mixing them and while the procane penicillin is precipitatng in order to insure the optimum yield and control the size of the crystals formed. If the necessary water is not added until after the addition of the procaine base agitation is necessary to convert the oily procaine penicillin to the crystalline form.

In carrying out my invention, I use a butyl acetate solution of the acid form of penicillin which has preferably been decolorized by any convenient method, however, such decolorization is not absolutely necessary. The volume of the butyl acetate extract employed may be the total volume resulting from the extraction of the fermentation broth, or the butyl acetate extract can first be concentrated to as low as 10% of its original volume. I have found it preferable to concentrate the butyl acetate extract before further treatment.

To carry out the preferred form of my process I add water to the decolorized butyl acetate extract of penicillin fermentation broth, either as extracted or after concentration, in the amount of from about 0.5 to about 4 ml. of water for each million units of penicillin present. Thereafter, procaine base is added to the butyl acetate and water solution in any convenient manner. Procaine base may conveniently be dissolved in a small volume of butyl acetate. I prefer to use a solution of about 25% procaine base in butyl acetate and to add the procaine base in an amount sufficient to theoretically precipitate all the penicillin present, or in amounts in excess of theoretical. Optimum yields of crystalline procaine penicillin have been obtained by the use of amounts of procaine base approximately 25% in excess of the amount theoretically required for complete precipitation of the penicillin. I prefer to employ an amount of procaine base of from 10 to 25% in excess of theoretical, although any amount of from theoretical to a 75% excess is effective.

After the addition of procaine base to the butyl acetate extract, agitation usually is continued until precipitation is complete. Generally, I have found one hour to be a sufficent period of agitation to insure complete precipitation. After precipitation is complete, the procaine penicillin crystals are recovered from the butyl acetate mixture by filtering, washing, and drying in the previously known manner.

The following examples will serve to illustrate my invention, but I do not intend to be limited by amounts of reactants or particular procedures shown therein, except as they are limited by the appended claims.

EXAMPLE I

There was added to 250 ml. of a concentrated butyl acetate extract containing 74,000 units of the acid form of penicillin per ml., 50 ml. of a butyl acetate solution containing 0.238 gram per ml. of procaine base. The solution was agitated for one hour. The precipitate which formed was very gummy and not in the form of discrete crystals. This precipitate was crystallized by scratching the side of the vessel and agitating further. After this treatment 18.25 grams of crystalline procaine penicillin was obtained which assayed 1010 units per mg. representing a yield of 99.6% of the activity contained in the concentrated extract.

EXAMPLE II

There was added to 250 ml. of a concentrated butyl acetate extract containing 54,900 units of the acid form of penicillin per ml. 25 ml. of water with agitation. This amount of water represented approximately 2 ml. per million units of penicillin activity present. Thereafter, there was added with continuous agitation 37 ml. of a solution containing 0.25 grams per ml. of procaine base in butyl acetate solution, which represents approximately a 40% excess of procaine base over theoretical. The resulting butyl acetate solution was agitated continuously for one hour and the crystalline procaine penicillin then recovered. There was obtained 13.0 grams of procaine penicillin crystals containing 1,016 units of penicillin per mg., which represented a yield of 96.2% of the activity in the concentrated butyl acetate extract.

EXAMPLE III

There was added to 6 liters of butyl acetate extract containing 5650 units of the acid form of penicillin per ml. with agitation 100 ml. of water (3.3 ml. per million units of activity) and thereafter 75 ml. of butyl acetate solution containing 0.25 gram per ml. of procaine base, representing a 12% excess over theoretical. The resulting butyl acetate solution was agitated for one hour and the crystalline procaine penicillin then recovered. A total of 30.25 grams of procaine penicillin crystals was recovered containing 1,025 units of penicillin per mg., which represents a yield of 91.6% of theoretical.

EXAMPLE IV

A portion of the same butyl acetate extract employed in Example III above was concentrated to 9% of the original volume. It then contained 74,000 units per ml. of the acid form of penicillin. There was added with agitation to 250 ml. of this concentrated butyl acetate extract 25 ml. of water (1.6 ml. per million units) and thereafter 40 ml. of butyl acetate solution containing 0.25 gram per ml. of procaine base, which represented a 35% excess over theoretical. Agitation was continued for one hour and 14.9 grams of procaine penicillin crystals were then recovered. This crystalline procaine penicillin contained 1,006 units per mg. representing a 95.5% yield.

EXAMPLE V

There was added with agitation, to 6 liters of butyl acetate extract containing 4500 units of the acid form of penicillin per ml. 400 ml. of water (3.7 ml. per million units) and 75 ml. of butyl acetate solution containing 0.25 gram per ml. of procaine base, representing a 50% excess over theoretical. The resulting butyl acetate solution was agitated continuously for one hour, and thereafter 22.8 grams of procaine penicillin crystals were recovered. This crystalline procaine penicillin contained 1,048 units per mg. which represented an 88.4% yield of penicillin in the extract.

EXAMPLE VI

In this example the water was added after the first precipitation. To 1,247 ml. of concentrated butyl acetate extract containing 50,600 units of the acid form of penicillin per ml. there was added with agitation 21 grams of Darco G–60, an activated charcoal. The charcoal was filtered out of the solution and to the resulting solution there was added 175 ml. of the butyl acetate solution containing 0.25 gram per ml. of procaine base, representing a 50% excess over theoretical. The resulting solution was agitated for one hour and the precipitate was very gummy. After the first hour of agitation 100 ml. of water (1.6 ml. per million units) was added and agitation continued for an additional hour. There was recovered 55.9 grams of crystalline procaine penicillin containing 1,005 units per mg., which represented a yield of 89.2% of theoretical.

EXAMPLE VII

A 2 liter sample of decolorized concentrated butyl acetate extract of the acid form of penicillin was divided into two portions and treated as follows:

First portion

To one liter of the above concentrate assaying 46,500 units per ml. there was added with agitation, 100 ml. of water (2 ml. per million units) and thereafter 100 ml. of butyl acetate solution containing 0.25 gram per ml. of procaine base, representing a 12% excess over theoretical. After one hour of additional agitation, 42.45 grams of crystalline procaine penicillin was recovered, assaying 1,090 units per mg., which represents a 99.5% yield.

Second portion

To the other 1 liter portion of the above concentrated butyl acetate extract assaying 46,500 units per ml. there was added with agitation 100 ml. of water (2 ml. per million units) and thereafter 150 ml. of butyl acetate solution containing 0.25 grams per ml. procaine base, representing a 75% excess over theoretical. After agitation was continued for one hour there was recovered 43.7 grams of crystalline procaine penicillin assaying 1,056 units per mg., which represents a 99.4% yield.

EXAMPLE VIII

A 2630 ml. sample of decolorized concentrated butyl acetate extract of the acid form of penicillin was divided into two portions and treated as follows:

First portion

To a 1315 ml. portion of the above concentrated extract containing 53,900 units per ml. there was added with agitation, 100 ml. of water (1.4 ml. per million units) and thereafter 131 ml. of butyl acetate solution containing 0.25 gram per ml. of procaine base, representing the theoretical amount necessary for full precipitation. After agitation was continued for one hour there was recovered 58.0 grams of crystalline procaine penicillin analyzing 1,058 units per mg., which represented a yield of 87.5%.

Second portion

To 1315 ml. of the above concentrated extract containing 53,900 units per ml. there was added, with agitation, 100 ml. of water (1.4 ml. per million units) and thereafter 196 ml. of a butyl acetate solution containing 0.25 gram per ml. of procaine base, representing a 50% excess over theoretical. After agitation was contained for one hour there was recovered 67.1 grams of crystalline procaine penicillin assaying 1,006 units per mg. and representing a yield of 95.3%.

Now having described my invention what I claim is:

1. A process for the production of crystalline procaine penicillin which comprises adding to a butyl acetate solution of the acid form of penicillin from about 0.5 to about 4.0 ml. of water for each million units of penicillin present, the amount of water added being in excess of that soluble in the butyl acetate solution, adding a solution of procaine base in butyl acetate, and recovering the precipitated crystalline procaine penicillin which forms.

2. A process for the production of crystalline procaine penicillin which comprises adding with agitation to a decolorized butyl acetate solution of the acid form of penicillin from about 0.5 to about 4.0 ml. of water for each million units of penicillin present, the amount of water added being in excess of that soluble in the butyl acetate solution, adding with continued agitation a solution of procaine base in butyl acetate to a concentration of from 0 to 75% excess of theoretical for precipitation of the penicillin present, and recovering the precipitated crystalline procaine penicillin which forms.

3. In a process for the production of crystalline procaine penicillin by reaction in butyl acetate solution of procaine base with the acid form of penicillin the step which comprises adding from about 0.5 to about 4.0 ml. of water for each million uits of penicillin present, the amount of water added being in excess of that soluble in the butyl acetate solution.

4. In a process for the production of crystalline procaine penicillin by reaction in butyl acetate solution of procaine base with the acid form of penicillin the step which comprises adding to the butyl acetate solution prior to the addition of the procaine base from 0.5 to about 4.0 ml. of water for each million units of penicillin present, the amount of water added being in excess of that soluble in the butyl acetate solution.

5. In a process for the production of crystalline procaine penicillin by reaction in butyl acetate solution of procaine base with the acid form of penicillin the step which comprises adding with agitation to the final resulting solution from about 0.5 to about 4.0 ml. of water for each million units of penicillin present, the amount of water added being in excess of that soluble in the butyl acetate solution.

References Cited in the file of this patent
UNITED STATES PATENTS

| | | |
|---|---|---|
| 2,515,898 | Rhodehamel | July 18, 1950 |

FOREIGN PATENTS

| | | |
|---|---|---|
| 286,676 | Switzerland | Mar. 2, 1953 |
| 655,649 | Great Britain | July 25, 1951 |